(12) United States Patent
Rabinowitz (10) Patent No.: US 7,112,253 B2
(45) Date of Patent: Sep. 26, 2006

(54) MANUFACTURING TRANSPARENT MIRRORED MINI-BALLS FOR SOLAR ENERGY CONCENTRATION AND ANALOGOUS APPLICATIONS

(76) Inventor: Mario Rabinowitz, 715 Lakemead Way, Redwood City, CA (US) 94062-3922

( * ) Notice: Subject to any disclaimer, the term of this patent is extended or adjusted under 35 U.S.C. 154(b) by 426 days.

(21) Appl. No.: 10/691,351

(22) Filed: Oct. 22, 2003

(65) Prior Publication Data

US 2005/0087294 A1 Apr. 28, 2005

(51) Int. Cl.
*G02B 5/08* (2006.01)
*B32B 37/04* (2006.01)
*B32B 38/04* (2006.01)

(52) U.S. Cl. .............. 156/268; 156/269; 156/499; 156/494; 156/528; 264/1.7; 264/2.6; 264/2.7; 264/160; 264/345; 359/900

(58) Field of Classification Search .............. 65/21.3, 65/54, 56, 59.1, 59.3
See application file for complete search history.

(56) References Cited

U.S. PATENT DOCUMENTS

| | | | |
|---|---|---|---|
| 3,670,323 A | 6/1972 | Sobel et al. ............ 340/324 R |
| 5,723,264 A * | 3/1998 | Robello et al. ............ 430/321 |
| 5,754,332 A | 5/1998 | Crowley .................... 359/296 |
| 5,808,783 A | 9/1998 | Crowley .................... 359/296 |
| 5,815,306 A | 9/1998 | Sheridon et al. ............ 359/296 |
| 5,914,805 A | 6/1999 | Crowley .................... 359/296 |
| 6,197,228 B1 | 3/2001 | Sheridon .................... 264/136 |
| 6,211,998 B1 | 4/2001 | Sheridon .................... 359/296 |
| 6,222,513 B1 | 4/2001 | Howard et al. ................ 345/84 |
| 6,243,058 B1 | 6/2001 | Mikkelsen et al. ........... 345/84 |
| 6,249,271 B1 | 6/2001 | Albert et al. ................ 345/107 |
| 6,262,707 B1 | 7/2001 | Sheridon .................... 345/111 |
| 6,335,818 B1 | 1/2002 | Torres ........................ 359/296 |
| 6,570,700 B1 | 5/2003 | Engler et al. ............... 359/296 |
| 6,612,705 B1 | 9/2003 | Davidson et al. ........... 359/851 |
| 2002/0131151 A1 | 9/2002 | Engler et al. ............... 359/296 |
| 2003/0117424 A1 | 6/2003 | Kinoshita et al. ........... 345/700 |
| 2003/0192998 A1 | 10/2003 | Davidson et al. | |
| 2003/0193726 A1 | 10/2003 | Davidson et al. | |
| 2003/0202235 A1 | 10/2003 | Rabinowitz et al. | |

* cited by examiner

*Primary Examiner*—Richard Crispino
*Assistant Examiner*—Barbara J. Musser (57) ABSTRACT

Method and apparatus are presented for manufacturing transparent mirrored spheroidal mini-balls for solar energy and related applications such as optical switches. For these applications it is imperative to provide accurate specular reflection from the mirror. Various means are described for maintaining the desired mirror flatness and avoiding warping, buckling, etc. of the mirror surface during manufacture. The mini-balls are in the size range of 4 microns ($4 \times 10^{-6}$ m) to 10 centimeters ($10^{-1}$ m), and are transparent in at least one hemisphere. They preferably have a reflecting mid-plane mirror, though they can also be mirrored on a flat top of the ball.

11 Claims, 7 Drawing Sheets

MANUFACTURING TRANSPARENT MIRRORED MINI-BALLS FOR SOLAR ENERGY CONCENTRATION AND ANALOGOUS APPLICATIONS

INCORPORATION BY REFERENCE

In a solar energy application, these transparent reflecting mini-balls are a critical feature of a unique solar concentrator as described in the following patent and copending, coassigned patent applications related to this case:

U.S. Pat. No. 6,612,705 issued to Davidson and Rabinowitz, entitled "MINI-OPTICS SOLAR ENERGY CONCENTRATOR", which is herein fully incorporated by reference.

The present invention relates to the manufacture of transparent mirrored mini-balls that are essential features of the following list of U.S. patent applications that have been filed prior to this application:

CROSS-REFERENCE TO RELATED APPLICATIONS

U.S. patent application of Rabinowitz Ser. No. 10/639,011, entitled "SPINNING CONCENTRATOR ENHANCED SOLAR ENERGY ALTERNATING CURRENT PRODUCTON";

U.S. patent application of Rabinowitz and Davidson Ser. No. 10/135,073, entitled, "DYNAMIC MULTI-WAVELENGTH SWITCHING ENSEMBLE";

U.S. patent application of Davidson and Rabinowitz Ser. No. 10/124,538, entitled, "SOLAR PROPULSION ASSIST";

U.S. patent application of Davidson and Rabinowitz Ser. No. 10/124,521, entitled, "ACTIVE REFLECTION, ILLUMINATION, AND PROJECTION."

BACKGROUND OF THE INVENTION

1. Field of the Invention

The instant invention relates to method and appartus for the manufacture of transparent mirrored mini-balls for solar energy concentration and related applications. The mini-balls are in the size range of 4 microns ($4 \times 10^{-6}$ m) to 10 centimeters ($10^{-1}$ m). In one form the mini-balls are transparent in at least one hemisphere, and have a mid-plane mirror. In another form, the mini-balls are quasi-hemispheres with a mirror on the flat top.

2. Description of the Prior Art

The manufacturing processes as taught herein are distinct and different from the prior art in at least two ways. First, none of the prior art is concerned with the manufacture of mirrors in transparent mini-balls, or on mini-balls. Second the prior art of others does not utilize reflecting mini-balls in the applications of the instant invention such as a Solar Concentrator, Optical Switching, Solar Propulsion Assist, and Active Reflection, Illumination, And Projection.

The U.S. patent application Ser. No. #2003/0117424 A1 of Kinoshita, Hayashi, and Ozaki, entitled COLORED ROTATION SPHERICAL MATERIAL, MANUFACTURING METHOD THEREFOR, AND DISPLAY DEVICE is concerned with enhancing the degree of whiteness of a ball in a display device. They have no transparent hemisphere and there is no specular mirror, both of which are key aspects of the instant invention. As stated in their Abstract:

"A colored rotation spherical material is configured so as to have two parts different from each other in color, such as a white part and a black part, and an optically reflective region between the two parts, such as a reflective layer. With this constitution, since the reflective layer reflects light which is usually absorbed in the black part, and the white part scatters the reflected light again, whiteness degree and reflectance increase."

This Abstract well decribes their intent throughout the patent application. Since the reflective region between their two colored hemispheres is not really a mirror, it doesn't matter to them if it gets rough and distorts in their manufacturing process described in conjunction with FIGS. 2A–2C. That is why no steps are taken to prevent distortion during heat treatment of the laminated parts. In the manufacturing process described in conjunction with FIGS. 3A–3C the reflective region not only can distort, but it is distorted to begin with since it is just fine metal particles: "the reflective layer may be manufactured by preparing a reflective resin sheet 27 by diffusing metal fine spherical materials 26 in thermoplastic resin in advance as shown in FIG. 3A . . . . (Paragraph 0034, lines 2–5.) To further illustrate that they do not require a mirror surface, after discussing aluminum as a vapor deposited film or as a material for the fine dispersed particles they state: "it is also possible to use resin including arbitrary optical reflection feature inside as the reflective layer." (Paragraph 0038, lines 4–6.) Their objective is just to enhance the white color in a display device. That is clearly why they are not trying to manufacture a mirror.

DEFINITIONS

"Collector" as used herein denotes any device for the conversion of solar energy into other forms such as electricity, heat, pressure, concentrated light, etc.

"Concentrator" in general is a device for focussing light to a collector or other device. As used herein, concentrator refers to a focussing planar mirror which is a thin almost planar mirror constructed with stepped varying angles so as to have the optical properties of a much thicker concave mirror. Heuristically, it can somewhat be thought of as the projection of thin variable-angular segments of small portions of a thick mirror upon a planar surface. It is a focusing planar reflecting surface much like a planar Fresnel lens is a focusing transmitting surface. The tracking-focussing property of an ensemble of tiny balls which make up the focussing planar mirror is an essential manufacturing goal of the instant invention.

"Dielectric" refers to an insulating material in which an electric field can be sustained with a minimum power dissipation. [Most transparent materials are dielectrics. However Indium/Tin Oxide (also called ITO in the literature) is a conductor that is also transparent.]

"Diffuse reflection" occurs when light is reflected in all directions from a surface (usually due to microscopic roughness such as from a matt surface). The diffuse light tends to follow a cosine distribution of intensity relative to a perpendicular line to the surface, where the maximum is in the perpendicular direction.

"Elastomer" is a material such as synthetic rubber or plastic, which at ordinary temperatures can be stretched substantially under low stress, and upon immediate release of the stress, will return with force to approximately its original length.

"Eutectic" is that composition of an alloy that has the lowest melting point.

"Mirror" as used herein refers to a highly reflective smooth surface (smooth on a size scale small compared to the wavelength of incident light). The smoothness achieves specular reflection.

"Packing fraction" refers to the fraction of an available volume or area occupied by a collection (ensemble) of objects. As used herein it refers to the available area of the collection of mirrors.

"Pipette" is a tube with a narrow orifice used to transfer given small measured quantities of liquid.

"Quasi-hemisphere, Partial-hemispere, or Flat-top ball" herein refers to a portion of a sphere with a flat top i.e. a planar surface, upon which a mirror is bonded. In most cases, a quasi-hemisphere refers to greater than half of a hemisphere. In most cases, a partial-hemisphere refers to less than half of a hemisphere to allow for a non-negligible mirror thickness in producing a full hemisphere.

"Specular reflection" occurs when the angle of reflection is equal to the angle of incidence of a light ray relative to a line perpendicular to the macroscopic reflecting surface, and lie in the same plane with it. Thus the reflected light ray travels in a definite predictable direction.

SUMMARY OF THE INVENTION

There is one object, and there are many aspects of this invention for the method and apparatus of manufacture of mirrored balls to be used in solar concentrators and analogous applications. All the aspects apply to the same objective of being technically sound, economically viable, practical, and efficient in the construction of specular mirrors in or on spheroidal mini-balls. As much as possible, the manufacture of mirrored balls is done expeditiously in situ using the concentrator itself in the process, so that the completed mirrored spheroids do not have to be moved.

In one aspect of the invention, surface tension of liquid droplets combined with gravity and adhesion (surface wetting force) on a mirror plate, form hemispheres which are then combined to form spheroids with midplane specular mirrors.

In another aspect of this invention, surface tension of liquid droplets combined with gravity and adhesion form quasi-hemispherical flat-top balls, which are mirrored on their plane surfaces.

In another aspect of the invention, specular mirrored midplane spheres are formed by metallic vapor deposition, or liquid metal contact on the flat portion of hemispheres. The hemispheres are then joined together forming a specular mirror in the midplane of the resultant spheroidal ball.

In another aspect of the invention, specular mirrored balls or cylinders are produced by metallic vapor deposition, or liquid metal contact on a flat section formed on the top of a ball or cylinder.

In another aspect of the invention, specular mirrored midplane balls are produced by surface tension from the formation of precisely cut nuggets on a tensioned thin metallic plate.

In another aspect of the invention, specular mirrored midplane balls are produced with a combination of hemispherical molds and metallic vapor deposition, or liquid metal contact on the flat portion of the hemispheres. The hemispheres are then joined together to form spheres with midplane specular mirrors.

In another aspect of the invention, specular mirrored midplane balls are produced by combining metallic and transparent hemispheres. The hemispheres are then joined together to form spheres with midplane specular mirrors.

Other objects and advantages of the invention will be apparent in a description of specific embodiments thereof, given by way of example only, to enable one skilled in the art to readily practice the invention singly or in combination as described hereinafter with reference to the accompanying drawings. In the detailed drawings, like reference numerals indicate like components.

DETAILED DESCRIPTION OF THE PRESENTLY PREFERRED EMBODIMENTS

As is described in detail, the manufacturing objectives of the instant invention may be accomplished by any of a number of ways separately or in combination, as taught herein.

Figure 1:
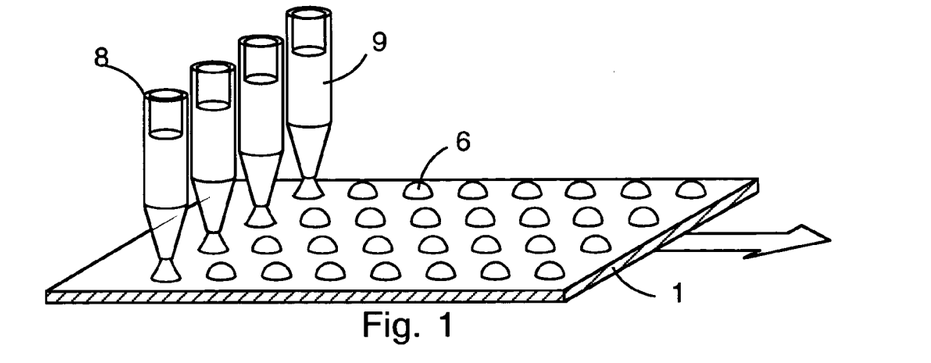
FIG. 1 is a perspective view showing a specularly reflecting mirror plate moving beneath a collection of pipettes which periodically dispense liquid dielectric to form hemispheres, quasi-hemispheres, or partial-hemispheres.

FIG. 1 is a perspective view showing an early stage of the manufacturing process for producing transparent spheroidal balls. A specularly reflecting mirror plate 1 moves beneath a collection of pipettes 8 which periodically dispense liquid dielectric 9 droplets which upon solidification form a regular array of adhering transparent hemispheres (also quasi-hemispheres, or partial-hemispheres) 6. The arrow indicates the motion of the mirror plate 1. The dielectric 9 may be in the liquid state because it is molten i.e. above its melting point; or because it is dissolved in a solvent which evaporates away, causing the dielectric to solidify as a hemisphere due to the interaction of surface tension, adhesion to the mirror plate 1, and gravity. When the droplets are so small that surface tension causes them to ball up, heating the plate 1 reduces the surface tension so that they can form quasi-hemispheres.

Figure 2:
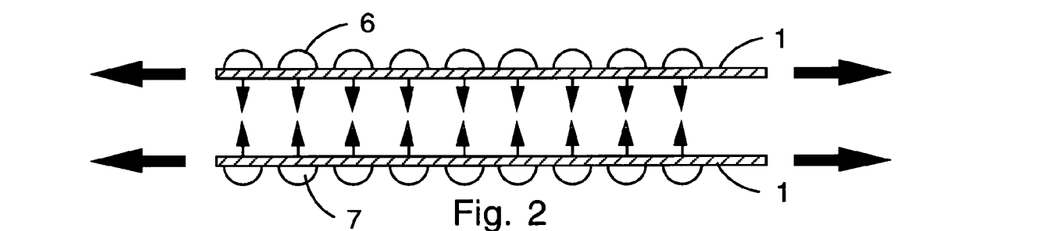
FIG. 2 is a cross-sectional view showing partial-hemispheres on two mirror plates being joined together.

FIG. 2 is a cross-sectional view showing the array of top hemispheres 6 on the mirror plate 1 being joined to an array of bottom hemispheres 7 on a similar mirror plate 1. The thick arrows indicate tension being applied to the thin mirror plate 1 to prevent distortion of its surface during the joining process.

Figure 3:
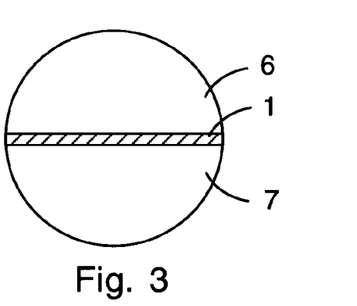
FIG. 3 Shows a single spheroidal ball with a midplane mirror, that is transparent on the top and on the bottom.

FIG. 3 Shows a single reflecting ball 1 with a midplane mirror 1, a transparent top hemisphere 6, and a transparent bottom hemisphere 7. Each ball 1 is removed from the joined plates.

Figure 4:
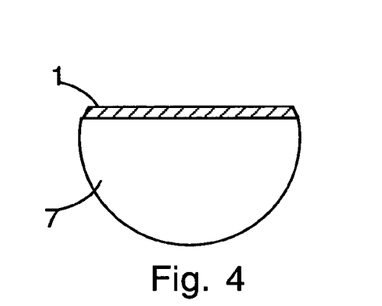
FIG. 4 Shows a single transparent quasi-hemisphere with a mirror on its flat top.

FIG. 4 Shows a single transparent quasi-hemisphere 2 with a mirror 1 on its flat top. By elimination of the joining step of FIG. 2, the transparent quasi-hemispheres 2 are removed from the single mirror plate 1, and are used for specular reflection focussing in the same manner as the spheroidal balls.

Figure 5:
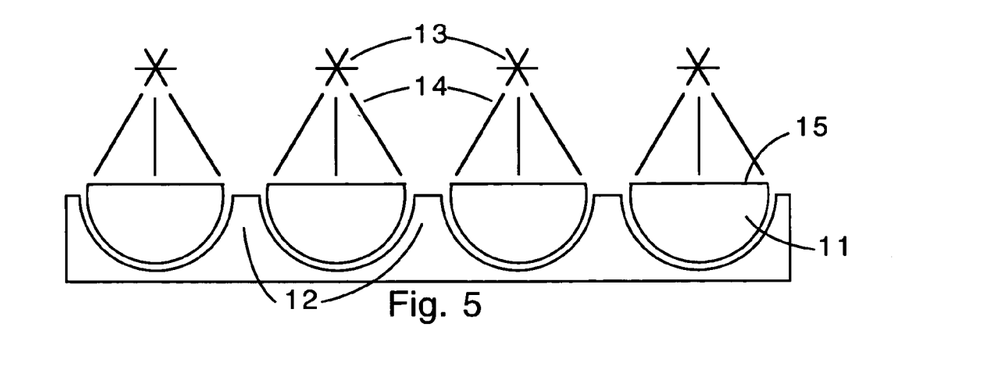
FIG. 5 is a cross-sectional view of an array of partial spheres with flat tops (flat-top spheres or quasi-hemispheres) cradled on top of the bottom ridged sheet of a concentrator. A matrix of vaporizers is depositing a thin layer of metal on the exposed flat-top spheres.

FIG. 5 is a cross-sectional view of an array of partial spheres with flat tops (quasi-hemispheres) herein called flat-top balls 11, cradled on top of the bottom ridged elastomer sheet 12 of a concentrator. The advantage of having the flat-top balls 11 nestled on the bottom ridged elastomer sheet 12 of a concentrator is that they do not need to be moved after being metallized to form the mirrors 15. The flat on the top of the ball can be produced by any of standard techniques such as machining, shearing, etc. The technique or combination of techniques used, will depend on the degree of optical flatness required. One starting point would be the quasi-hemispheres of FIGS. 1 and 4 that are not bonded to the plate. (The flat tops could be machined prior to metal deposition if a high degree of optical flatness is necessary.) A matrix of vaporizers 13 emits vapor 14 to deposit a thin mirror 15 layer of metal on the exposed flat-top balls. The sides of the balls and some of the ridged elastomer structure will inadvertantly also become metallized. This inadvertant mirroring does no harm, and contributes a little to the light reaching the collector. Aluminum is a good choice for the reflecting material because it is inexpensive and highly reflective. Only about 1000 Angstroms of Aluminum is required to achieve a high degree of reflection. For most of the effective wavelengths the reflectivity of Al is over 88%. An alternate to vapor deposition is the brushing on of a low temperature liquid metal (such as discussed in the Section DISCUSSION OF PRESENTLY PREFERRED EMBODIMENTS) on the flat tops.

Figure 6:
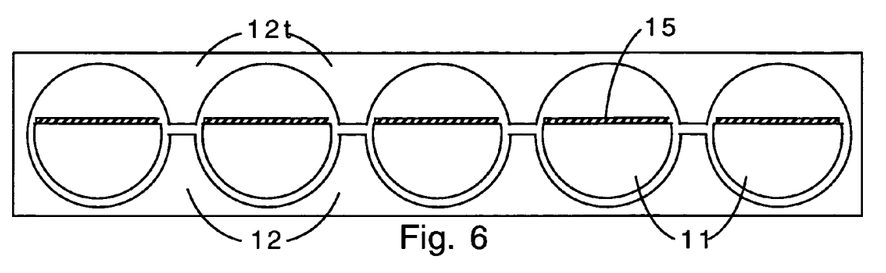
FIG. 6 is a cross-sectional view of a concentrator showing an array of mirrored flat-top balls in a concentrator.

FIG. 6 is cross-sectional view of a concentrator 3 showing mirrors 15 on the flat-top balls 11 cradled on top of the bottom ridged elastomer sheet 12 with a transparent ridged elastomer top 12t. The transparent ridged elastomer top 16 is added to the partial concentrator structure of FIG. 5 to enclose and complete the concentrator 3. The ridged elastomer cellular structure is conducive, but not necessary, to hold the balls in place. However, confinement of the balls in tight packed arrangement (close packing fraction) can also hold the balls in place. Since the area of the flat top of a ball is less than the midplane equatorial area, the effective ensemble packing fraction is reduced. This is somewhat made up for by a decrease in shadowing of one mirror on another.

Figure 7:
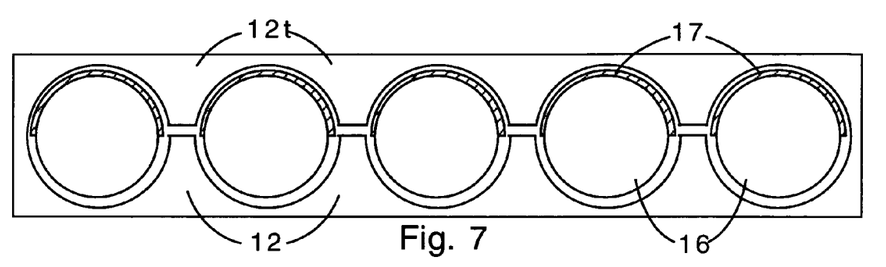
FIG. 7 is a cross-sectional view of a concentrator showing an array of mirrored balls in a concentrator.

FIG. 7 is a cross-sectional view of a concentrator 4 showing an array of balls 16 with mirrors 17 on the top hemisphere of the balls. The balls 16 are cradled on top of the bottom ridged elastomer sheet 12 with a transparent ridged elastomer top 12t. Confinement of the balls in a close packed arrangement can also hold the balls in place. However the ridged elastomer cellular structure is conducive, but not necessary, to hold the balls in place. Because the balls 16 have a small radius ($2 \times 10^{-6}$ m to $10^{-1}$ m), light rays would diverge from the balls 16 whether the mirror 17 is convex with the mirrored hemisphere at the top as shown, or whether the mirror 17 is concave with the balls 16 inverted so that the mirrored hemisphere is at the bottom. This can be ameliorated by having groups of a large assembly of balls form a concave fresnel surface that focusses to the center of collector somewhat as shown in FIG. 8 for flat-top balls or cylinders.

Figure 8:
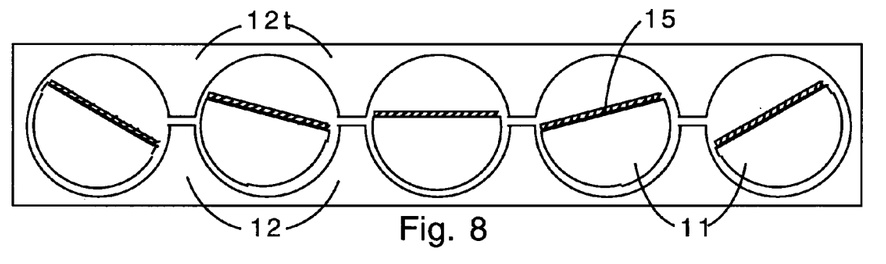
FIG. 8 is a cross-sectional view of a group of flat-top spheres (or flat-top cylinders) in effective planar concave formation.

FIG. 8 is a cross-sectional view showing a group of flat-top balls (or flat-top cylinders) in effective concave formation in a concentrator 3 with mirrors 15 on the flat-top balls 11 cradled on top of the bottom ridged elastomer sheet 12 with a transparent ridged elastomer top 12t. Focussin to the collector is enhanced when groups of a large assembly of balls form an effective concave fresnel surface. For example for balls with a diameter of 100 microns ($10^{-4}$ m=0.1 mm) a million balls would cover an area ~100 cm$^2$. Groups of ~$10^6$ balls each, could be given an equivalent concavity to focus at a collector ~10 m away. A typical concentrator 3 would have an enormous number of billions of balls, which track and focus the sun in groups of millions.

Figure 9:
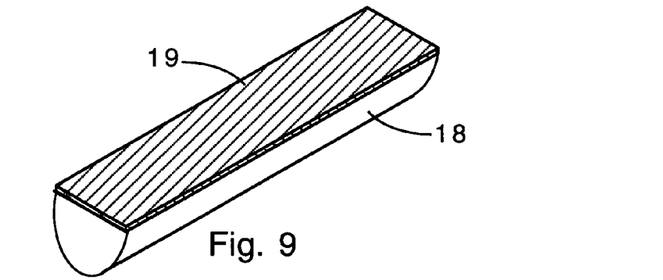
FIG. 9 Single flat-top cylinder with metal coating on it.

FIG. 9 is a perspective view of a single flat-top cylinder 18 with a specular reflecting mirror 19 on top. In FIGS. 6–8, instead of spheres the depiction could be of cylinders with single axis tracking of the sun.

Figure 10:
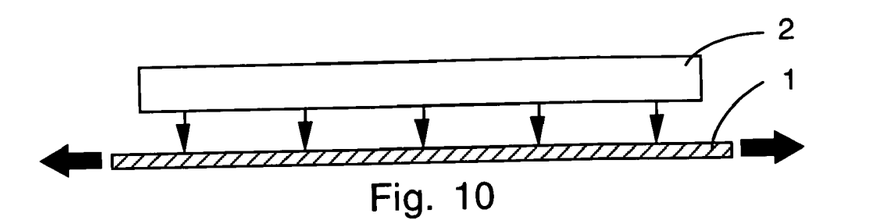
FIG. 10 is a cross-sectional view showing a transparent dielectric slab being joined to a thin metallic mirror plate with a smooth surface.

FIG. 10 is a cross-sectional view showing an early stage of the manufacturing process for producing transparent spheres with a specularly reflecting mirror plate 1 in the equatorial plane. A top transparent dielectric slab 2 is being joined to a thin metallic mirror plate 1 with a smooth surface. The thick arrows indicate tension being applied to the thin mirror plate 1 to avoid distorting its surface during the process.

Figure 11:
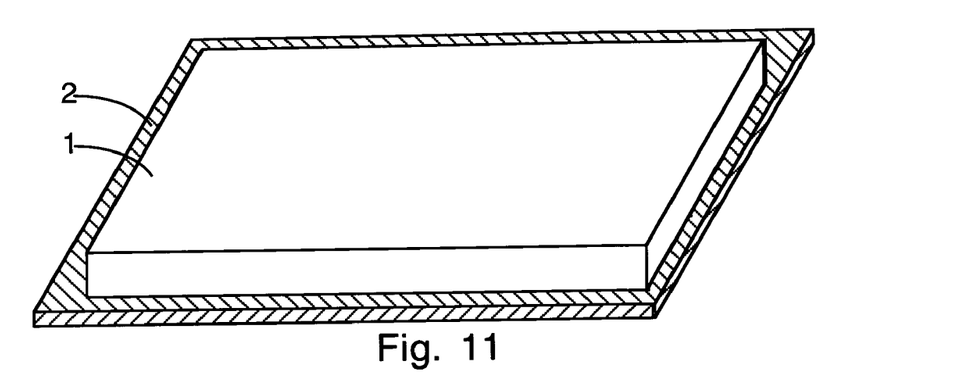
FIG. 11 is a perspective view showing a transparent dielectric slab bonded to the top of the mirror plate having a lip protruding beyond the dielectric slab for the application of tension to prevent buckling.

FIG. 11 is a perspective view showing a transparent dielectric slab 2 bonded to the top of the mirror plate 1. A lip protrusion of the metallic mirror plate 1 extends around all sides so that tension may be applied to the mirror plate 1 during all steps of the process to prevent buckling. The lip is also useful for introducing and directing heat flow in the step following the formation of nuggets.

Figure 12:
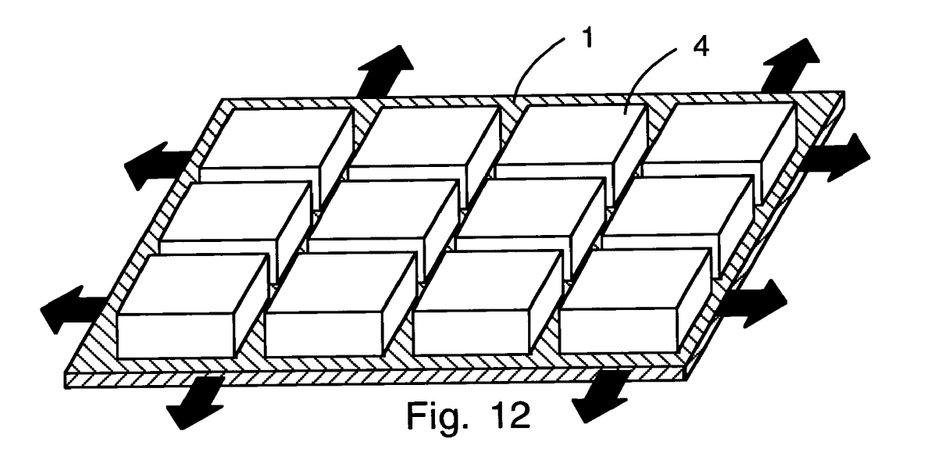
FIG. 12 is a perspective view after broad cross cuts have left widely spaced square nuggets bonded to the mirror plate. Proper heat treatment converts the nuggets into hemispheres by means of surface tension.

FIG. 12 is a perspective view after broad cross cuts have been made into the transparent dielectric slabs. This manufacturing step leaves widely spaced square nuggets 4 bonded to the mirror plate 1. Tension is applied to the mirror plate 1 by means of the protruding mirror lips to prevent buckling of the surface of the mirror plate 1 during the cutting stage, and especially in the ensueing heat treatment stage. The heat treatment process increases the temperature of the nugget 4 just to the point where surface tension raises the nugget 4 up against the wetting force to the mirror plate 1 and the downward gravitational force, to become a partial-hemisphere. Expeditious solidification captures the desired hemispherical geometry.

In addition to the application of tension, it is important to observe critical geometrical constraints for the heat treatment to result in a smooth specularly reflecting mirror plate 1 between two hemispheres. Such considerations have not been taught by the prior art such as Kinoshita et al as previously discussed, because a specularly reflecting mirror surface is not important for their objective of increasing the whiteness of one their hemispheres. To minimize stress as a nugget block transforms into a hemisphere, the square area of a nugget of side length s, should be matched with the cross-sectional area of the plane surface circle of diameter d, which bounds a hemisphere:

$$s^2 = \pi\left(\frac{d}{2}\right)^2 \Rightarrow s = \frac{\sqrt{\pi}}{2}d = 0.89d. \tag{1}$$

Another geometrical constraint is that of matching the volume of the two square nuggets each of side s and height h with the volume of the desired sphere. When the thickness of the mirror plate 1 is small compared to the height of a nugget:

$$2hs^2 = \frac{4}{3}\pi\left(\frac{d}{2}\right)^3 = \frac{\pi}{6}d^3. \tag{2}$$

Substituting eq. (1) for s into eq. (2) implies that $$h = \frac{d}{3}. \tag{3}$$

Thus we have obtained the optimal relationships between s, d, and h. Equation (1) implies that each cross cut must have a width:

$$w > d - s = d - 0.89d = 0.11d > 0.11\left(\frac{s}{0.89}\right) = 0.12s. \tag{4}$$

If the width of a cross cut does not exceed 0.12s=0.11 d, the material from one nugget will merge with that of an adjoining nugget and surface tension will interfere to prevent the formation of hemispheres.

The use of the term hemispheres is appropriate in our context, as long as the mirror plate 1 is relatively thin comparted to the radius of the hemisphere. For thick mirrors, the hemisphere should be considered to be a partial hemisphere so that the diameter perpendicular to the mirror plane is approximately equal to the diameter parallel to the mirror plane.

Figure 13:
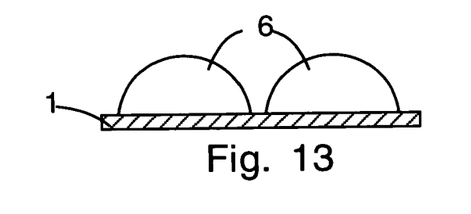
FIG. 13 is a cross-sectional view after heat treatment of the nuggets showing an array of hemispheres bonded to the top of the mirror plate.

FIG. 13 is a cross-sectional view after heat treatment of the nuggets showing hemispheres 6 on the top of the mirror plate 1, produced by surface tension of the transparent dielectric material at elevated temperature.

Figure 14:
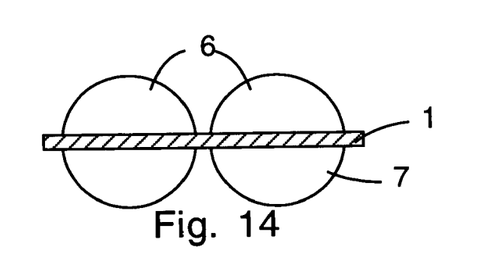
FIG. 14 Shows an array of top hemispheres on a mirror plate joined together with an identical array of bottom hemispheres.

FIG. 14 Shows an array of top hemispheres 6 on a mirror plate 1, as in FIG. 13, joined together with an identical array of bottom hemispheres 7. Registration (allignment) of the hemispheres 6 with the hemispheres 7 is achieved by careful registration of the mirror plate lips.

Figure 15:
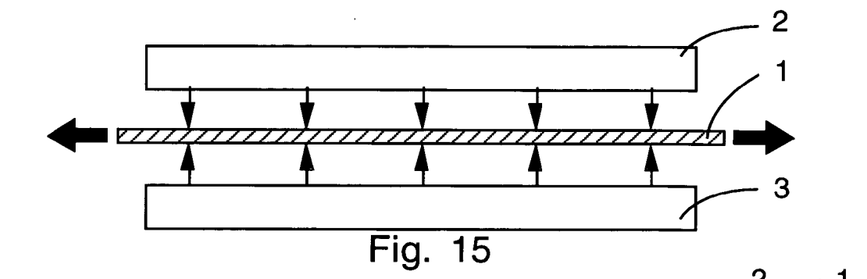
FIG. 15 is a cross-sectional view of two transparent dielectric slabs being joined to a thin metallic mirror with a smooth surface with tension applied to avoid warping.

FIG. 15 is a cross-sectional view showing an early stage of the manufacturing process for producing transparent spheres with a specularly reflecting mirror plate 1 in the equatorial plane. A top transparent dielectric slab 2 and a bottom dielectric slab 3 are being joined to a thin metallic mirror plate 1 with a smooth surface. The thick arrows indicate tension being applied to the thin mirror plate 1 to avoid warping its surface during the process.

Figure 16:
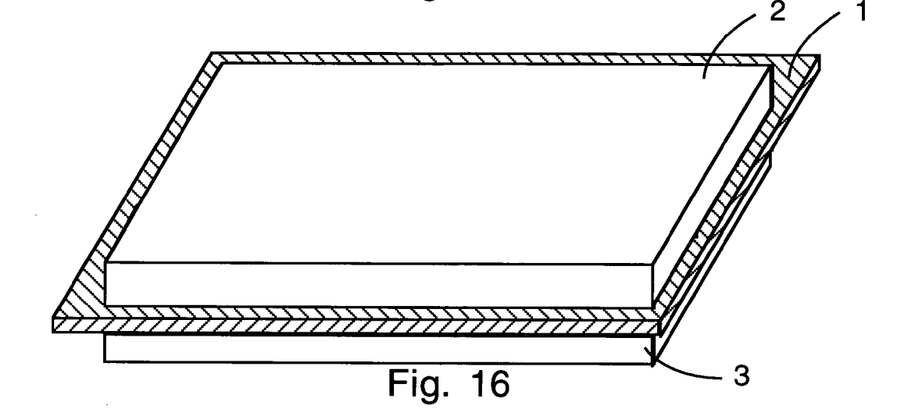
FIG. 16 is a perspective view of two transparent dielectric slabs bonded to both sides of the mirror.

FIG. 16 is a perspective view showing the two transparent dielectric slabs 2 and 3 bonded to both sides of the mirror 1. A lip protrusion of the metallic mirror plate 1 extends around all sides for two purposes. One reason is so that tension may be applied to the mirror plate 1 during all steps of the process—especially the heating process—to prevent buckling. The other reason is to provide a method for heating the dielectric by: conduction of heat through the metal; induction heating; etc. Of course the entire assembly can be put in a furnace. Professional engineer Felipe Garcia concurs that immersing the entire assembly in an inert liquid heat bath such as silicone oil is an exceptional method. The liquid heat bath provides sufficient buoyant force to the forming hemispheres that one may readily produce top hemispheres 6 concurrently with bottom hemispheres 7.

Figure 17:
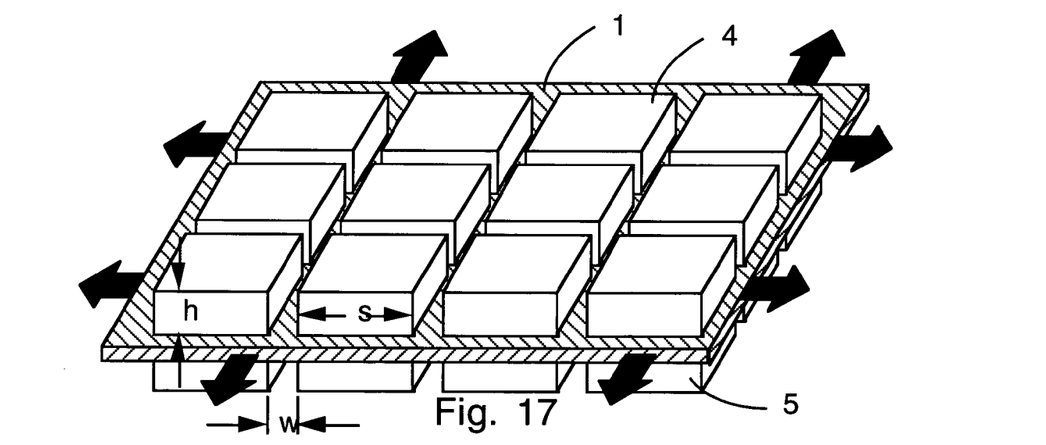
FIG. 17 is a perspective view after broad cuts have been made into the two transparent dielectric slabs. This manufacturing step leaves widely spaced square nuggets bonded to both sides of the mirror. Tension is applied to the mirror surface by means of the protruding mirror lips to prevent buckling of the mirror surface.

FIG. 17 is a perspective view after broad cross cuts have been made into the two transparent dielectric slabs. This manufacturing step leaves widely spaced square nuggets 4 bonded to both sides of the mirror plate 1. Tension is applied to the mirror plate 1 by means of the protruding mirror plate lips to prevent buckling of the surface of the mirror plate 1 during the cutting stage, and especially in the ensueing heat treatment stage.

Figure 18:
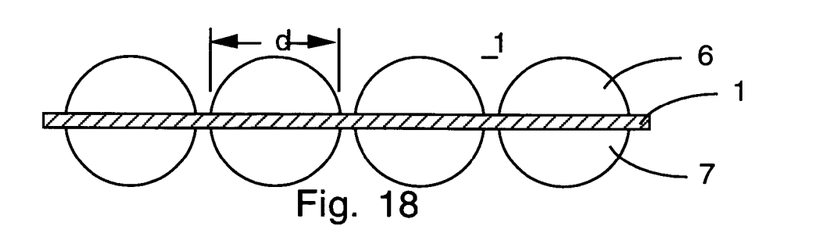
FIG. 18 is a cross-sectional view after heat treatment of the nuggets showing hemispheres on the mirror surfaces, produced by surface tension of the transparent dielectric material.

FIG. 18 is a cross-sectional view after heat treatment of the nuggets showing hemispheres 6, produced by surface tension of the transparent dielectric material at elevated temperature, on top of the mirror plate 1 and hemispheres 7 on the bottom of the mirror plate 1. The spheres 1 can be punched out, or the excess metal etched away leaving individual spheres L each with a smooth specular reflecting equatorial plane.

Figure 19:
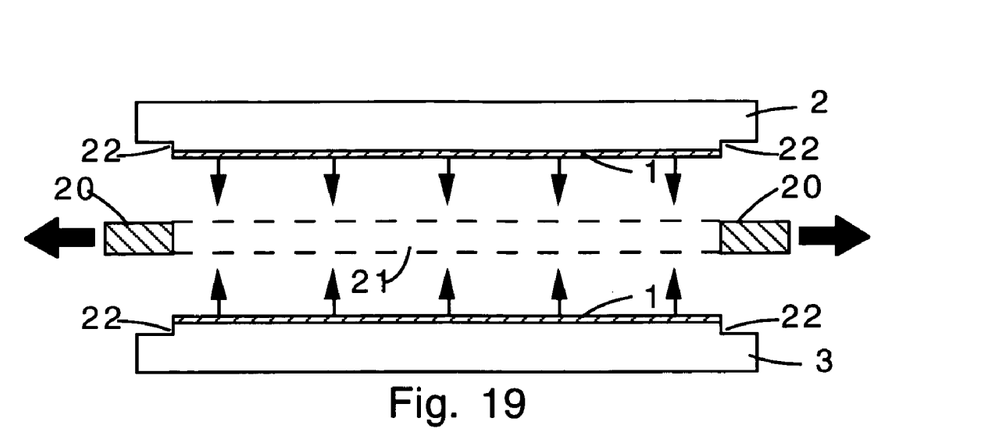
FIG. 19 is a cross-sectional view of a thin metallic mirror bonded to two dielectric slabs which are being joined to a tension plate (with a center cut-out) by means of which tension is provided in order to avoid warping of the mirror surfaces.

FIG. 19 is a cross-sectional view of a top transparent dielectric slab 2 and a bottom dielectric slab 3 each bonded to a thin metallic mirror 1, being joined to a tension plate 20 (with a center cut-out 21) by means of which tension is provided in order to avoid warping of the mirror surfaces. The dielectrics 2 and 3 have counter-cuts 22 so that the mirrors 1 can be bonded together. The thick arrows indicate tension being applied to the tension plate 20 to avoid warping of the mirrors 1 during the manufacturing process.

Figure 20:
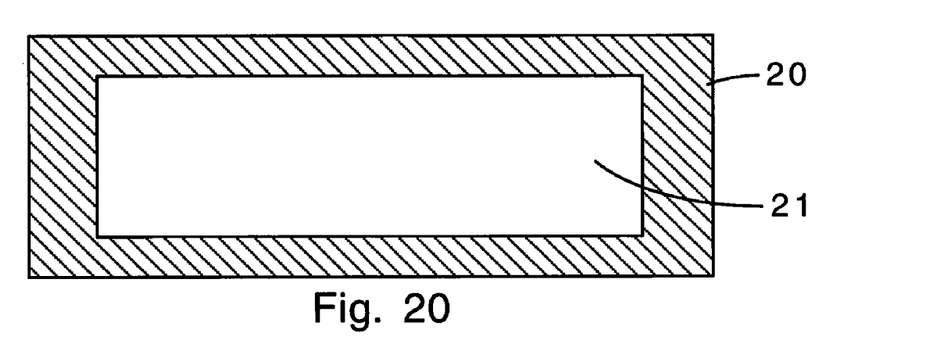
FIG. 20 is a top view of the tension plate showing the center cut-out.

FIG. 20 is a top view of the tension plate 20 showing the center cut-out 21.

Figure 21:
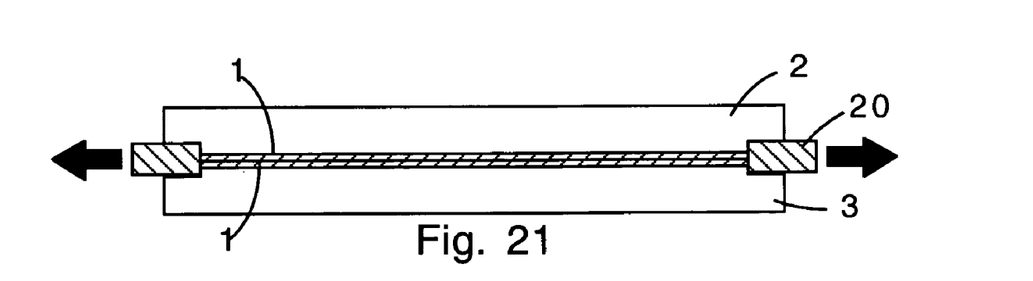
FIG. 21 is a cross-sectional view of the two dielectric slabs bonded to the tension plate, and with mirrors bonded to each other. Thereafter the steps of cross-cutting, heat treatment, and formation of spheres with mirrored equatorial planes are as described in conjunction with FIGS. 17 & 18 or FIGS. 12–14.

FIG. 21 is a cross-sectional view of the dielectric slabs 2 and 3 bonded to the tension plate, and with the mirrors 1 bonded to each other. Thereafter the steps of cross-cutting, heat treatment, and formation of spheres with mirrored equatorial planes is as described in conjunction with FIGS. 17 & 18 or FIGS. 12–14.

DISCUSSION OF PRESENTLY PREFERRED EMBODIMENTS

There are many tradeoffs in manufacturing the transparent reflecting mirrored mini-balls and cylinders for solar energy and analogous applications. One tradeoff is between materials costs versus manufacturing costs. Another tradeoff is between small and large volume fabrication. The conclusions reached today may well have to be changed in the light of new costs and new developments in the future. Even if the relative costs remain fixed, a change in product yields with increased sophistication of the manufacturing process may tip the balance in a new direction. What may be best for low concentrations of 5x to 20x for a concentrator, may not be true for 100x and higher as different considerations come into play such as angular resolution. What may be preferable for small volume production, may be impractical for large scale manufacturing. Similarly, the desired size of the balls favors some manufacturing techniques. The balls may range in size from 4 microns to 10 cm. For smaller balls, the processes that rely on surface tension are preferable. For the larger balls surface tension cannot be relied upon, and the processes that utilize molds are preferable. Also concentrators that employ larger balls, require considerably fewer balls, making mold manufacturing less expensive. All these things are moving, not fixed targets.

For example a thin plate mirror has greater materials costs than a vapor deposited thin film mirror but may have lower manufacturing costs for small quantity production. Making tiny spheres by means of molds may be prohibitive for mass production, but may be ideal for initial small scale assembly. Flatness of the mirror is not critical for low concentrations, but for a concentrator with a 100x or better, high pointing accuracy of better than + or −0.5 degrees is desirable, and for 1000x an alignment accuracy of + or −0.05 degrees may be necessary. Similarly high alignment accuracy may be needed when using the reflecting balls in analogous applications for an optical switch, for rocket boost, and for light projection such as are taught in the patents and patent applications of Davidson and Rabinowitz: U.S. Pat. No. 6,612,705, Ser. No. 10/639,011; Ser. No. 10/135,073; Ser. No. 10/124,538; and Ser. No. 10/124,521. Hence the term "flat-top balls" means "optically-flat-top balls" for these applicatons, where optically flat implies that the mirror surface is both smooth and planar (very flat).

Aluminum (Al) is relatively inexpensive and makes a good mirror with only ~1000 Å thickness. However for some low temperature dielectrics such as carnauba wax, it may preferable to use low temperature metals like indium (In), tin (Sn), gallium (Ga), and their alloys. For example a eutectic alloy of gallium-indium-tin with composition by weight of 62.5% gallium, 21.5% indium, and 16.0% tin has a melting point of only 10° C. Thus it is liquid at room temperature, and can form a durable mirror surface by contact coating. It has a vapor pressure of only $10^{-8}$ Torr at 600° C., with a boiling point of 2000° C. There are other such alloys that are preferable for low temperature manufacture, but that have the disadvantage of high material cost.

Examples of materials that are appropriate dielectrics for making or coating the balls are: acrylic polymers made from acrylic derivatives such as acrylic acid, methacrylic acid, ethyl acrylate, and methyl acrylate; glass, castor wax, carnuba wax, polyethylene, polyester, and other plastics.

Rotational control of the balls can be achieved by electrostatic, magnetostatic, electromagnetic, electrophoretic, and/or magnetophoretic means as described in the referenced patents and patent applications. In the electrostatic and magnetostatic cases, the dipole moment of a ball aligns itself with the electric or magnetic field vector imposed by the grid electrode structure. In the electrostatic case, the dipole may either be embedded in the matertial, or be based on the zeta (shear) potential which creates a dipole moment on the surface of a ball. The grid electrode structure is embedded on the ridged cellular sheets that support and confine the balls. The sheets are an elastomer, mylar, or other plastic material upon which a conducting, but highly resistive material like Indium/Tin Oxide (ITO) can be sputtered. The optically transparency of ITO makes it ideally suited for addressing the balls.

For some methods of rotational control, it may be desirable to divide up the mirror into separate regions to reduce induced current losses such as eddy current losses; and induced dipole moments. This division is easily achieved by standard masking techniques when the mirror is produced by vapor deposition or brushing on of low temperature liquid metal. This would be difficult to accomplish for a plate mirror bonded to the dielectric.

DETAILED DESCRIPTION OF ADDITIONAL EMBODIMENTS

While the instant invention has been described above with reference to presently preferred embodiments, as just discussed other embodiments may at times also be desirable. These are now described in detail.

Figure 22:
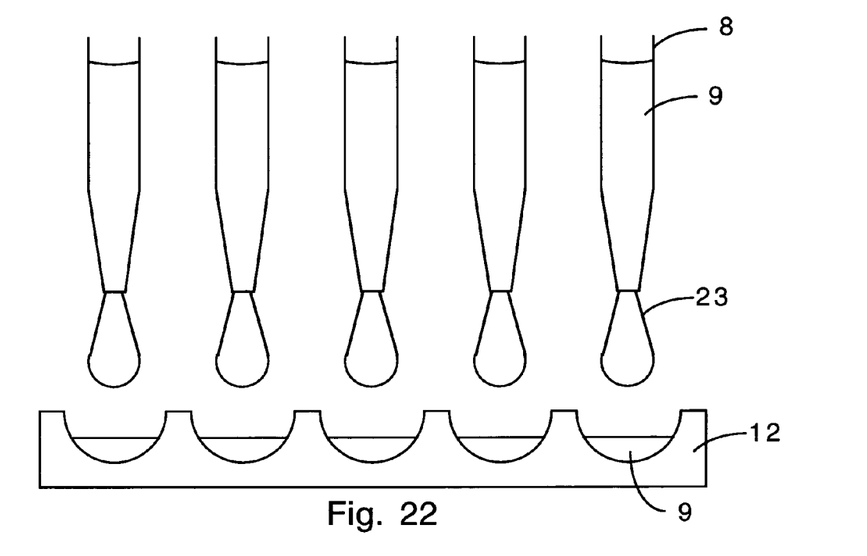
FIG. 22 is a cross-sectional view showing a collection of pipettes which dispense liquid dielectric to form hemispheres in a mold array which later serves as part of a concentrator.

FIG. 22 is a cross-sectional view showing an initial stage of the manufacturing process for producing transparent spheres. A collection of pipettes 8 dispense liquid dielectric 9 forming droplets 23 that go into a regular array of hemispherical molds 12 which are the bottom ridged elastomer sheet 12 of a concentrator so that the completed balls do not need to be moved after being metallized to form mirrors. The dielectric 9 may be in the liquid state because it is molten i.e. above its melting point; or because it is dissolved in a solvent. The dielectric 9 solidifies in the mold due to cooling, or because the solvent evaporates away.

Figure 23:
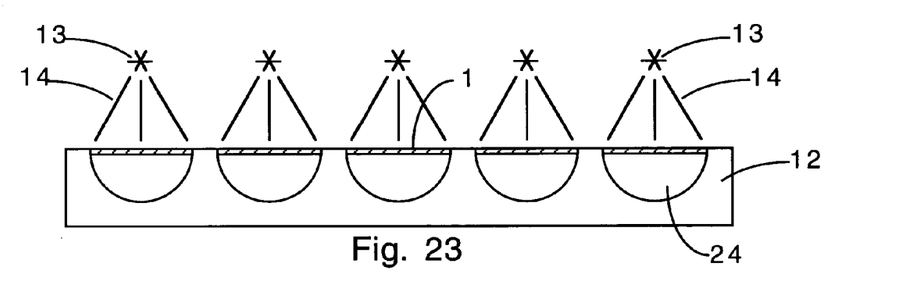
FIG. 23 is a cross-sectional view of an array of hemispheres on a ridged elastomer sheet upon which a matrix of vaporizers deposits mirrors on the exposed flat plane of the hemispheres.

FIG. 23 is a cross-sectional view of an array of partial-hemispheres 24, cradled on top of a ridged elastomer sheet 12 of a concentrator. A matrix of vaporizers 13 emits vapor 14 to deposit a thin metal mirror 15 on the exposed flat plane of the hemispheres 24. The sides of the balls and some of the ridged elastomer structure will also become metallized. This inadvertant mirroring does no harm, and contributes a little to the light reaching the collector. An alternate to vapor deposition is the brushing on of a low temperature liquid metal on the flat planes of the hemispheres 24.

Figure 24:
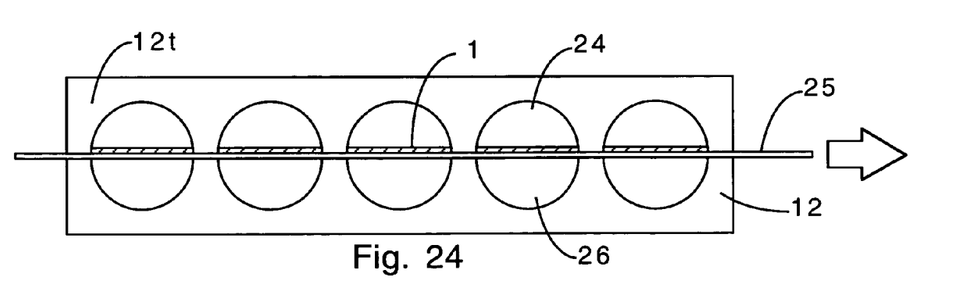
FIG. 24 is a cross-sectional view of two alligned arrays of hemispheres in order to join them together to form mirrored spheres in a concentrator.

FIG. 24 is a cross-sectional view of an array of hemispheres 24, showing how they are joined together to form mirrored spheres. A plate 25 is placed over the mirrored hemispheres and the assembly of mirrored hemispheres 24 in the ridged elastomer sheet 12t of a concentrator is inverted. The plate 25 holds the hemispheres 24 in place in their cells (which were formerly their molds). A second nearly identical array of hemispheres 26 in a ridged elastomer sheet 12 is alligned (registered) with the top array. This second set of hemispheres 26 is shown as not being mirrored for clarity of the illustration. In practice this second set of hemispheres 26 may be mirrored. Then the plate is removed. The arrow indicates the motion of the plate 25. The hemispheres 24 are bonded to the hemispheres 26 to form spheres with midplane mirrors 1. And the top ridged elastomer sheet 12t is then bonded to the bottom ridged elastomer sheet 12t to form a concentrator.

Figure 25:
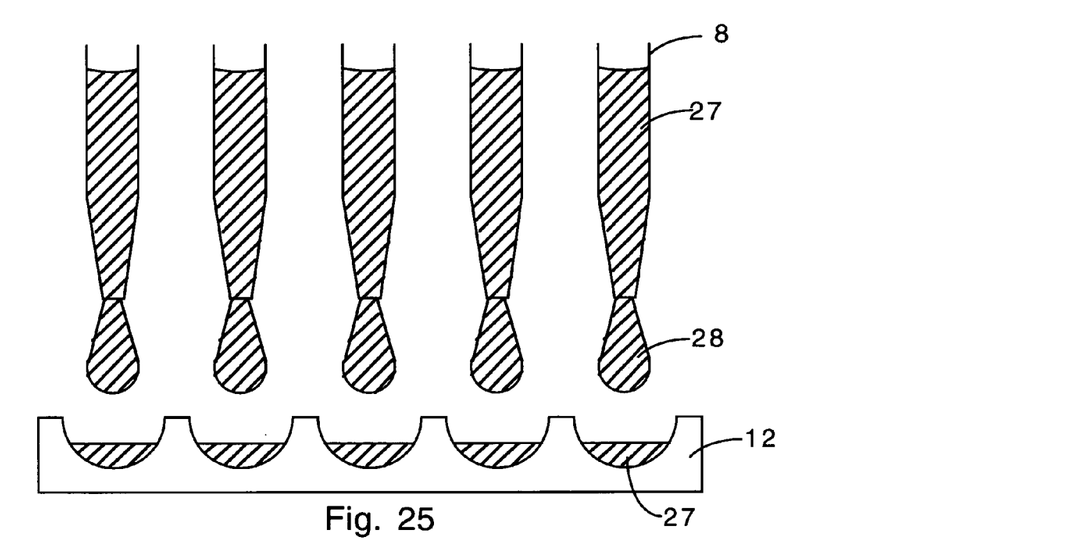
FIG. 25 is a cross-sectional view showing a collection of pipettes which dispense liquid metal to form hemispheres in a mold array which later serves as part of a concentrator.

FIG. 25 is a cross-sectional view showing a collection of pipettes 8 dispensing liquid metal 27 forming droplets 28 that go into a regular array of hemispherical molds 12 which are the bottom ridged elastomer sheet 12 of a concentrator so that the completed balls do not need to be removed. The metal 27 may be a low temperature element or alloy so that it is in the liquid state at a relatively low temperature.

Figure 26:
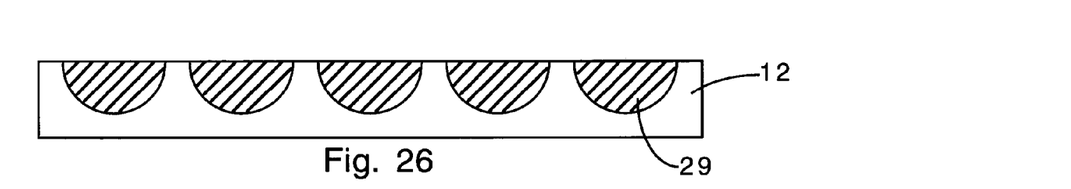
FIG. 26 is a cross-sectional view of an array of metal hemispheres on a ridged elastomer sheet, wherein the exposed flat shiny plane of the hemispheres serves as a mirror.

FIG. 26 is a cross-sectional view of an array of metallic hemispheres 29, cradled on top of a ridged elastomer sheet 12 of a concentrator. The exposed flat shiny plane of the hemispheres 29 serves as a mirror.

Figure 27:
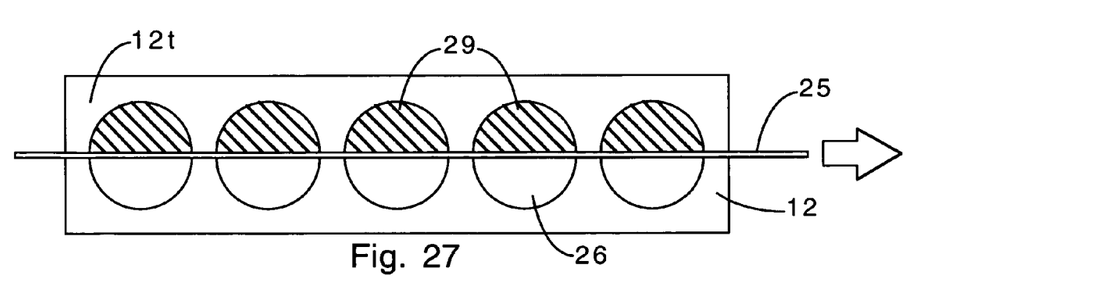
FIG. 27 is a cross-sectional view of an array of metallic specularly reflecting mirrors alligned with an array of transparent hemispheres in order to join them together to form mirrored spheres in a concentrator.

FIG. 27 is a cross-sectional view of an array of metallic hemispheres 29, and transparent hemispheres 26 showing how they are joined together to form mirrored spheres. The transparent hemispheres 26 are formed as described in conjunction with FIGS. 22 and 23. A plate 25 is placed over the metallic hemispheres 29 and the assembly of mirrored hemispheres 24 in the ridged elastomer sheet 12t of a concentrator is inverted. The plate 25 holds the metallic hemispheres 29 in place in their cells (which were formerly their molds). A second nearly identical array of transparent hemispheres 26 in a ridged elastomer sheet 12 is alligned (registered) with the top array. Then the plate is removed. The arrow indicates the motion of the plate 25. The metallic hemispheres 29 are bonded to the transparent hemispheres 26 to form spheres with midplane mirrors 1. And the top ridged elastomer sheet 12t is then bonded to the bottom ridged elastomer sheet 12t to form a concentrator.

While the instant invention has been described with reference to presently preferred and other embodiments, the descriptions are illustrative of the invention and are not to be construed as limiting the invention. Thus, various modifications and applications may occur to those skilled in the art without departing from the true spirit and scope of the invention as summarized by the appended claims together with their full range of equivalents.

The invention claimed is:

1. A method for fabricating mirrored mid-plane spheroidal balls using a plurality of nuggets bonded to a plate, the method comprising the steps of:
    a) bonding a first dielectric plate to one side of a metallic plate and a second dielectric plate to the opposite side of the metallic plate to form an assembly wherein the metallic plate functions as a mirror material;
    b) cross cutting said first and second dielectric plates to form an array of evenly spaced nuggets on said metallic plate;
    c) heat treating said nuggets to form hemispheres on both sides of said metallic plate;
    d) removing the combination of adjoining hemispheres with sandwiched metallic plate between them to form rotationally free mirrored midplane spheroidal balls.

2. The method of claim 1 wherein the heat treating comprises immersing the nuggets in a hot liquid.

3. The method of claim 1 wherein said first dielectric plate and said second dielectric plate are transparent.

4. The method of claim 1 wherein said first dielectric plate is transparent and second dielectric plate is opaque.

5. The method of claim 1 wherein said metallic plate maintains tension on the assembly.

6. A method for fabricating micro-mirrored balls for directed reflection of light, comprising the steps of
    a) advancing an assembly comprised of at least one sheet of reflective material covered by sheets of transparent material on either side, said reflective material functioning as a mirror;
    b) said assembly kept under tension;
    c) cross-cutting said assembly into nuggets;
    d) heating said nuggets to form micro-mirror balls made of hemispheres on either side of the reflective material;
    e) punching out said micro-mirror balls from said sheet; and
    f) placing said micro-mirror balls in a heat bath.

7. Apparatus for producing micro-mirror balls comprising:
    a) a supply of laminates comprised of at least one plate of reflective material covered by two dielectric plates, one on either side;
    b) a device for applying tension to said laminate;
    c) a tool which cross cuts said dielectric plates into nuggets;
    d) a heater for heating said nuggets to form micro-mirror balls made of hemi-spheres on either side of the reflective material; and
    e) a punch which punches out said micro-mirror balls.

8. An apparatus for making micro-mirror balls comprising:
    a) a supply of flexible laminate plate of thin metallic material sandwiched between two thin transparent materials;
    b) a device for applying tension to said laminate;
    c) a tool which cross cuts said transparent materials into nuggets;
    d) a heater for heating said nuggets to form micro-mirror balls made of metallic material sandwiched between hemi-spheres; and
    e) a punch which punches out said micro-mirror balls.

9. A method of manufacturing micro-mirror balls, comprising the steps of
    a) providing a laminate plate consisting of a thin reflective material sandwiched between two thin dielectric materials wherein the reflective material functions as a mirror material;

b) providing tension to prevent said laminate plate from buckling;

c) cross-cutting said dielectric materials on said reflective material to form nuggets;

d) heating said nuggets to form hemispheres on either side of the reflective material;

e) punching out said hemispheres to form micro-mirror balls from said laminate plate.

10. The method of claim 9 wherein said balls are heat treated.

11. The method of claim 9 wherein said balls are heat treated in a liquid bath.

* * * * *